US008288507B2

(12) United States Patent
Freund et al.

(10) Patent No.: US 8,288,507 B2
(45) Date of Patent: Oct. 16, 2012

(54) METASTABLE REACTION MIXTURES FOR THE IN SITU POLYMERIZATION OF CONDUCTING POLYMERS

(75) Inventors: Michael S. Freund, Winnipeg (CA); Elda Bravo-Grimaldo, Winnipeg (CA); Sarah Hachey, Winnipeg (CA)

(73) Assignee: University of Manitoba, Winnipeg (CA)

( * ) Notice: Subject to any disclaimer, the term of this patent is extended or adjusted under 35 U.S.C. 154(b) by 447 days.

(21) Appl. No.: 11/915,358

(22) PCT Filed: May 29, 2006

(86) PCT No.: PCT/CA2006/000879
§ 371 (c)(1),
(2), (4) Date: Aug. 18, 2009

(87) PCT Pub. No.: WO2006/125325
PCT Pub. Date: Nov. 30, 2006

(65) Prior Publication Data
US 2009/0299031 A1 Dec. 3, 2009

Related U.S. Application Data

(60) Provisional application No. 60/684,970, filed on May 27, 2005.

(51) Int. Cl.
*C08G 75/00* (2006.01)
(52) U.S. Cl. .......................... 528/377; 528/380
(58) Field of Classification Search ................... 528/377, 528/380, 373
See application file for complete search history.

(56) References Cited

U.S. PATENT DOCUMENTS

| 4,986,886 A | * | 1/1991 | Wei et al. ........................ 205/419 |
| 5,120,807 A | | 6/1992 | Wei et al. |
| 5,510,438 A | | 4/1996 | Ferraris et al. |
| 6,001,281 A | | 12/1999 | Lessner et al. |
| 6,056,899 A | | 5/2000 | Lessner et al. |

(Continued)

FOREIGN PATENT DOCUMENTS

CA 1332643 10/1994

(Continued)

OTHER PUBLICATIONS

Aeiyach et al. "Electropolymerization of thiophene on oxidizable metals in organic media", Journal of Electroanalytical Chemistry, 1997, vol. 434, pp. 153-162.

(Continued)

*Primary Examiner* — Randy Gulakowski
*Assistant Examiner* — Shane Fang

(57) ABSTRACT

Conducting polythiophene films are produced by the oxidation of bithiophene or terthiophene monomers using phosphomolybdic acid, wherein the reagents are first combined to form a metastable solution, the solution is then cast as a film, and polymerization ultimately initiated by evaporation of the solvent The equivalent formation of polypyrrole via the oxidation of pyrrole using phosphomolybdic acid has been previously demonstrated, but this approach cannot be applied directly to thiophene, which has too high an oxidation potential Bithiophene and terthiophene have lower oxidation potentials, close to that of pyrrole This work suggests the previously demonstrated method is suitable for general application, requiring only the proper matching of monomer and oxidant redox potentials, and the selection of a suitable solvent and starting concentration Smooth, spin-coated polythiophene films having thicknesses of 100 to 200 run and conductivities in the range 0.2 to 0.3 S-cm$^{-1}$ have been prepared.

18 Claims, 5 Drawing Sheets

U.S. PATENT DOCUMENTS

| | | | |
|---|---|---|---|
| 6,867,281 | B2 | 3/2005 | Martin et al. |
| 2004/0214985 | A1 | 10/2004 | Martin et al. |

FOREIGN PATENT DOCUMENTS

| | | | |
|---|---|---|---|
| CA | 1337950 | | 1/1996 |
| CA | 2310622 | | 2/1999 |
| EP | 0 323 351 | A1 | 7/1989 |
| EP | 0 339 340 | A2 | 11/1989 |
| JP | 04-293919 | | 10/1992 |
| JP | 5-9271 | * | 1/1993 |
| JP | 2002-529694 | | 9/2002 |
| WO | WO 99/08105 | A1 | 2/1999 |
| WO | 00/26638 | | 5/2000 |
| WO | 2011003197 | | 1/2011 |

OTHER PUBLICATIONS

Allcock et al., "Polyphosphazenes Bearing Polymerizable Pyrrole, Thiophene, and Furan Side Groups: Synthesis and Chemical Oxidation" Chem. Mater, 1992, vol. 4, pp. 780-788.

Bridgeman, "Density function study of the vibrational frequencies of α-Keggin heteropolyanions", Chemical Physics, 2003, vol. 287, pp. 55-69.

Can et al. "Electropreparation and Electrochemical Stability of Polythiophenes in Acetonitrile Containing Anhydrous $HBF_4$", Journal of Applied Polymer Science, 2000, vol. 77, pp. 312-322.

Diaz et al. "Electrooxidation of Aromatic Oligomers and Conducting Polymers", J. Electroanal. Chem., 1981, vol. 121, pp. 355-361.

Diaz et al., "Electrochemical Synthesis of Conducting Polymers", 1986, vol. 1, Chapter 3, pp. 81-115, Skotheim, ed., Marcel Dekker; New York.

Freeman et al. "Dendrimer-Containing Light-Emitting Diodes: Towards site-Isolation of Chromophores", J. Am. Chem. Soc. 2000, vol. 122, pp. 12385-12386.

Freund et al. "Growth of thin processable films of poly(pyrrole) using phosphomolybdate clusters" Inorganica Chimica Acta, 1995, vol. 240, pp. 447-451.

Freund et al. "Pyrrole-phosphomolybdic acid solutions as means for producing conducting poly(pyrrole) coatings on insulating substrates" Current Separations, 1994, vol. 13:3, pp. 66-69.

Freund et al. "A chemically diverse conducting polymer-based "electronic nose"", Prod, Natl. Acad. Sci, USA, Mar. 1995, vol. 92, pp. 2652-2656.

Gómex-Romero et al. "Chemical polymerization of polyaniline and polypyrrole by phosphomolybdic acid" Solid State Ionics, 1997, vol. 101-103, pp. 875-880.

Jang et al. "Poly(thiophene)s Prepared via Electrochemical Solid-State Oxidative Cross-Linking. A Comparative Study", Macromolecules, 2004, vol. 37, pp. 4351-4359.

Jonas et al. "Technical Applications for Conductive Polymers", Electrochimica Acta, 1994, vol. 39, No. 8/9, pp. 1345-1347.

Lonergan, "A tunable Diode Based on an Inorganic Semiconductor Conjugated Polymer Interface", Science, Dec. 19, 1997, vol. 278 p. 2103-2106.

Ruckenstein et al. "Polythiophene and polythiophene-based conducting composites", Synthetic Metals, 1991, vol. 44, pp. 293-306.

Scherman et al. "Romp of 1,3,5,7-cyclooctatetraene (cot) with a ruthenium olefin metathesis catalyst coordinated with a n-heterocyclic carbene ligand", Polymeric Materials: Science & Engineering, 2001, vol. 84, p. 603.

Sotzing et al. "Preparation and Properties of Vapor Detector Arrays Formed from Poly(3,4-ethylenedioxy) thiophene—Poly(styrene sulfonate)/Insulating Polymer Composites", Anal. Chem., 2000, vol. 72, pp. 3181-3190.

Thompson et al. "In Situ Colorimetric Analysis of Electrochromic Polymers and Devices", Chem. Mater 2000, vol. 12, pp. 1563-1571.

Visy et al., "Electrochemically Polymerized Terthiophene Derviatives Carrying Aromatic Substituents", Macromolecules, 1994, vol. 27, pp. 3322-3329.

Wang et al. "Comparative Study of Chemically Synthesized and Plasma Polymerized Pyrrole and Thiophene Thin Films", Thin Solid Films, 2004, vol. 446, pp. 205-217.

White et al. "Vapour transport growth of thin films of polypyrrole and poly-(N-methylpyrrole) oxidatively polymerised with heteropolyacids", Journal of Materials Chemistry, 2003, vol. 13, pp. 1345-1350.

Supplementary European Search Report for related European Application No. 06 74 1584, Jun. 2010.

E. Bravo-Grimaldo et al. Metastable Reaction Mixtures for the in Situ Polymerization of Conducting Polymers. Macromolecules. 40: 7166-7170 (2007).

S.L. McFarlane et al. A One-Step. Organic-Solvent Processable Synthesis of PEDOT Thin Films via in Situ Metastable Chemical Polymerization. Macromolecules. 43: 10241-10245 (2010).

Examination Report for Japanese Application No. 2008-512660. Apr. 24, 2012.

* cited by examiner

METASTABLE REACTION MIXTURES FOR THE IN SITU POLYMERIZATION OF CONDUCTING POLYMERS

BACKGROUND OF THE INVENTION

Over the past several decades, there has been a surge of interest in the synthesis and properties of conducting polymers. These polymers are typically synthesized by one of three general methods, including chemical (Allcock and Dodge, 1992 Chem Mater 4: 780), electrochemical (Diaz and Bargon in Handbook of Conducting Polymers, Vol. 1, Chapter 3, Skotheim, ed., Marcel Dekker: New York, 1986), and plasma polymerization (Wang et al., 2004, Thin Solid Films 446: 205). Numerous applications using conducting polymers have been proposed, ranging from molecular electronics to anti-corrosive agents. Despite the promise of these new materials, relatively few viable technologies have emerged from proof-of-concept laboratory studies. One of the biggest impediments to the successful implementation of these polymers has been their lack of processability. That is, these polymers cannot be melted or extruded nor are they soluble in many solvents. Therefore, they are not easily processed, for example, molded or painted. Several elegant approaches have been developed over the years to impart processability. For example, the addition of bulky side chains along the backbone can disrupt $\pi$-$\pi$ interactions resulting in soluble conducting polymers. However, this approach invariably leads to lower conductivities (Jang et al., 2004, Macromolecules 37: 4351) due to reduced $\pi$-orbital overlap along the backbone (Scherman and Grubbs, 2001, Polymeric Materials Science and Engineering 84: 603). Alternative approaches use emulsions or suspensions that can be processed; however they typically retain the original microstructure present in solution. Recently it was demonstrated that homogeneous polymer structures can be created by flash welding films consisting of nanoparticles of conducting polymers; however more work is required to determine of how this thermal processing impacts the electronic properties of the polymer since conductivities obtained decreased by an order of magnitude.

In this work we explore an alternative strategy involving the use of metastable mixtures of monomer and oxidant that enable processability followed by in situ polymerization initiated by solvent evaporation. This approach was originally demonstrated with pyrrole/phosphomolybdic acid mixtures that were used to produce will-behaved polypyrrole films (Freund et al., 1995, Inorganica Chimica Acta 240: 447) that could be deposited on a variety of substrates enabling previously un-reported applications including composite polymer-based sensing arrays (Freund and Lewis, 1995, PNAS 92: 2652) and hybrid electronic devices (Lonergan, 1997, Science 278: 2103). The proposed mechanism responsible for this process involves the formation of a metastable mixture of oxidant and monomer by selecting an oxidant whose formal potential is close to, but lower than, the oxidation potential of the monomer. This insures that the concentration of oxidized monomer (a radical cation) is relatively low, thereby resulting in a relatively slow polymerization rate (a radical coupling reaction). While the solutions are metastable under dilute conditions, when concentrated (upon solvent evaporation) the rate-limiting radical coupling reaction becomes significantly faster, resulting in a rapid increase in the concentration of n-mers that in turn have lower oxidation potentials with their increased conjugation length (Diaz et al., 2000, J Am Chem Soc 122: 12385). The increased concentration of radical cations, resulting from the more favourable thermodynamics, causes a further increase in the polymerization rate as the reaction cascades.

This synthetic strategy should be general and applicable to any polymer system involving a similar redox-driven polymerization. Theoretically, all that is required is the proper balance of relative redox potentials of the monomer and oxidant as well as concentration and solvent evaporation rate. Polythiophene is a more stable conducting polymer that has proven to be a useful material in a wide range of technologies, including charge dissipating films (Heywang and Jona, 1994, Electrochimica Acta 39: 1345), light-emitting diodes (Frechet et al., 2000, J Am Chem Soc 122: 12385), electrochromic devices (Reynolds et al., 2000, Chem Mater 12: 1563), and organic vapour sensors (Briglin et al., 2000, Anal Chem 72: 3181). Since the oxidation potential for thiophene is higher than pyrrole (2.07 and 1.30 V vs. SCE, respectively) the synthetic approach requires altering the oxidation potential of either the monomer or phosphomolybdic acid. In this case it is straightforward to manipulate the oxidation potential of the monomer by utilizing either bithiophene (1.31 V) or terthiophene (1.05 V), which have redox potentials near of that of pyrrole (1.30V). The formal potential of phosphomolybdic acid is 0.36 V. In addition, solvent and concentration must be taken into to insure the formation of a metastable solution.

SUMMARY OF THE INVENTION

According to a first aspect of the invention, there is provided a method of generating a processable polymer comprising:

mixing a monomer and an oxidant in a solvent, wherein the oxidant has an oxidation potential that is close to but lower than the oxidation potential of the monomer; and evaporating the solvent, thereby producing a processable polymer.

The polymer may be a polythiophene.
The monomer may be bithiophene or terthiophene.
The oxidant may be phosphomolybdic acid.
The solvent may be acetonitrile.
The polymer may be formed by spin coating.
The polymer produced preferably is smooth and pinhole-free.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Herein, it is demonstrated that the polymerization approach utilizing metastable monomer/oxidant mixtures for in situ polymerization can be extended to other systems, including the polythiophene system, provided that the selected oxidant has a close to but lower than oxidation potential than the selected monomer. In an exemplary example, spin coated thin polythiophene films from bithiophene monomer exhibit similar electrochemical behaviour as the electrochemically grown polythiophene films. Films obtained by this method were smooth and exhibit conductivities without the need of conducting substrate, electrolyte or electrochemical equipment. Also, by increasing the concentration of oxidant (phosphomolybdic acid) in the initial mixture it is possible to obtain conducting polythiophene films without the need of an extra oxidizing step of the final films. It was also found that solvent plays an important role in the polymerization process and must be taken into account when applying this approach to new systems.

As discussed herein, the films produced are smooth and pin-hole free. As will be appreciated by one of skill in the art, this means that the described polymers can be used for example to make a layered structure or an electrochromic device for a display. Furthermore, the polymers themselves are much easier to use in many applications, for example but by no means limited to OLED displays, antistatic coatings, polymer-based electronics and the like.

The rate of polymerization occurring in the metastable solutions can be followed with UV-vis spectroscopy. First, we studied the role of the solvent in the polymerization of polythiophene in solution with either acetonitrile or THF using UV-vis spectroscopy. Data obtained from UV-vis showed that it was not possible to obtain polythiophene in the presence of THF. It is possible that THF interacts with the Keggin structure precluding interaction with bithiophene, which may for some reason may be required. However, if this is the case, it is unclear why the lack of this sort of interaction between acetonitrile and the Keggin structure would impact the polymerization of pyrrole, which should not act as a Lewis base as is the case with thiophene.

Figure 1:
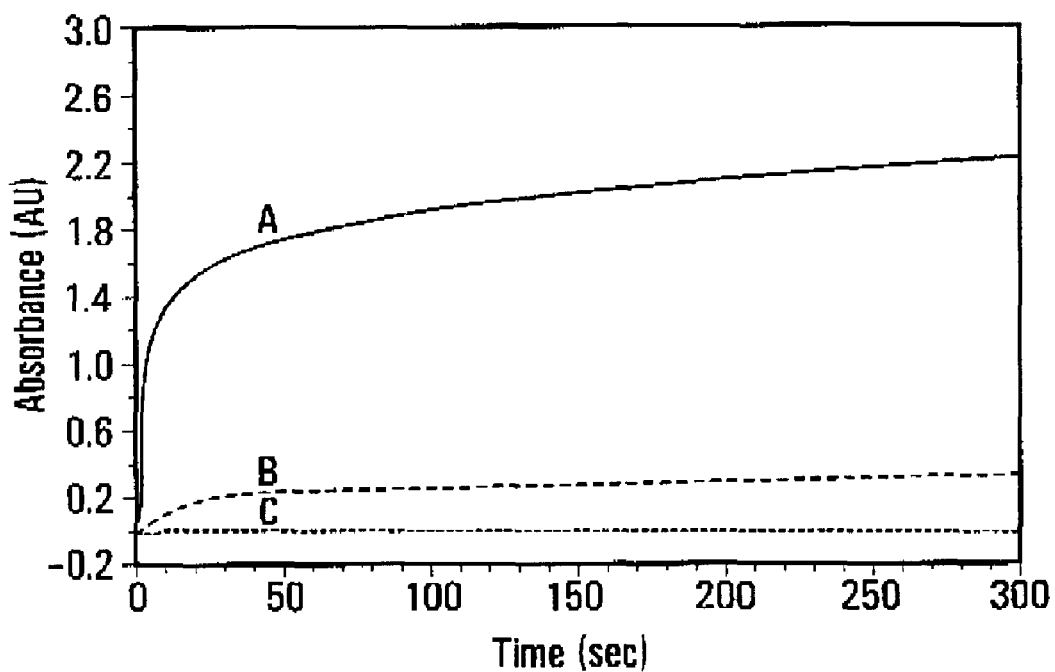
FIG. 1. Absorbance vs. time for phosphomolybdic acid with a) terthiophene, b) bithiophene and c) thiophene in acetonitrile.

Kinetics. To further study the chemical polymerization of polythiophene, mixtures of monomer and oxidant were studied by UV-vis in function of time. Data collected show, as expected: that the polymerization rate of the monomer, dimer and trimer follows the trend of oxidation potential where the lower the oxidation potential the polymerization rate increases (FIG. 1). While the polymerization of thiophene was unsuccessful (the redox potential of thiophene is too high for phosphomolybdic acid to act as an efficient oxidant) even though after a period of 12 hours, no polymer was formed in solution. Both bithiophene and terthiophene resulted in successful polymerization of polythiophene in solution. Upon formation of chemically generated polythiophene, a peak at ~700 nm is observed. It has been reported that during the electrochemical polymerization of polythiophene from terthiophene in propylene carbonate, an absorption band is observed at ~600 nm. This film is said to be in its neutral (non-conducting) form (Kankare et al., 1994, Macromolecules 27: 3324). Based on this comparison, it is reasonable to postulate that under the conditions described above, the band at around ~700 nm increases due to the formation of polythiophene in its oxidized form. To further investigate the kinetics of the monomer (bithiophene) and oxidant mixture in solution, the concentration dependence of the polymerization rate was explored. Specifically, the polymerization of bithiophene was observed while keeping the monomer concentration constant and varying the concentration of phosphomolybdic acid. It was found that increasing the concentration of phosphomolybdic acid does in fact increase the rate of reaction.

To further study the polymerization under different conditions solution mixtures were prepared in THF. We reported before that in presence of THF it was possible to prepare smooth and pinhole-free polypyrrole films. However, in the case of polythiophene, THF produced films with non-homogeneous surfaces and low conductivities. THF is more volatile than acetonitrile, and thus perhaps it evaporates too quickly, before the polymerization reaction has adequate time to take place. Even after allowing the reaction mixture to sit in a closed system from 30 minutes, up to 3 hours before spin coating, the homogeneity of the resulting films was still poor. When the UV-vis kinetics of bithiophene and phosphomolybdic acid in THF were studied, no well-defined peak occurred in the region of 700 rim or elsewhere. This indicates that polythiophene is not chemically generated in the presence of THF.

In order to verify that polythiophene was indeed produced as a result of the spin coating process, the electrochemical behaviour (using ITO substrate), UV-vis spectroscopy and FT-IR spectroscopy of the films were measured and compared to a standard electrochemically grown film.

Figure 2:
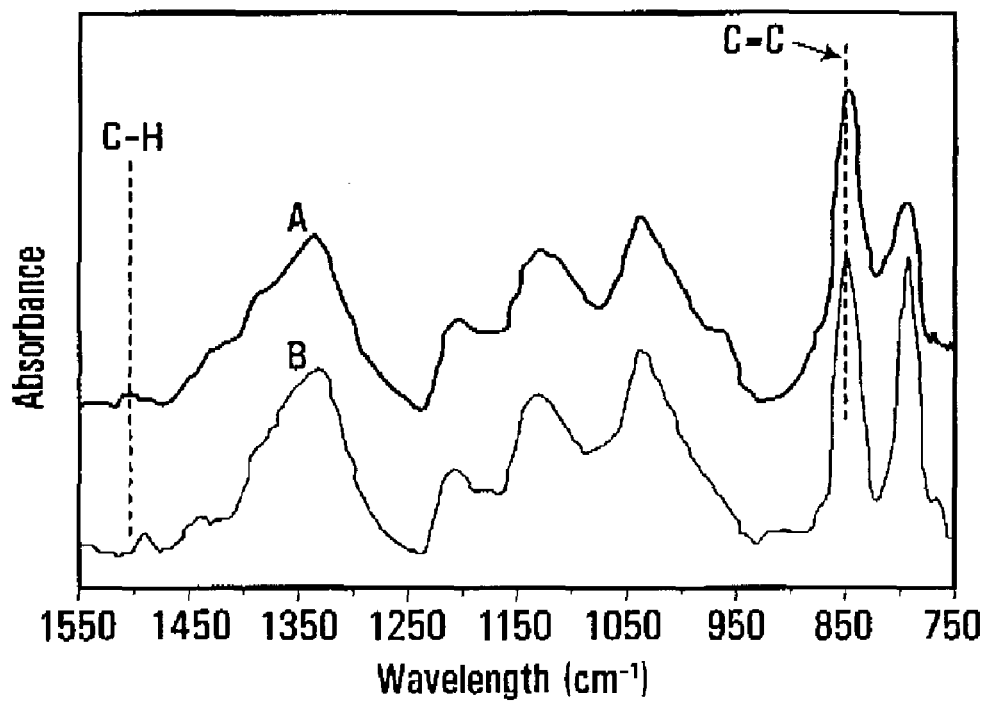
FIG. 2. FT-IR spectra of polythiophene a) spin-coated on ITO vs. b) electrochemically grown polythiophene on ITO substrate.

The FTIR absorption spectra of the chemically and electrochemically prepared films appear to be similar (FIG. 2). Films prepared in both manners exhibit characteristic vibrations of polythiophene. The presence of the vibration bands at 1550 and 825 $cm^{-1}$, which corresponds with literature values for the absorption of films prepared by both methods (Kang et al., 2004, J Thin Solid Films 446: 210; Can et al., 2000, J of Applied Polymer Science 77: 321) demonstrates that polythiophene is produced during the spin-coating process. The peak at 825 $cm^{-1}$ is representative to the aromatic C—H out of plane deformation and the 1500 $cm^{-1}$ is due to the C=C in plane vibration. The characteristic peak positions associated with phosphomolybdic acid (if present) would include a P—O stretch at 1065 $cm^{-1}$, M=O terminal at 963 $cm^{-1}$, M-O-M corner share at 867 $cm^{-1}$, and M-O-M edge share at 784 $cm^{-1}$ (Slade and White, 2003, J Materials Chemistry 13: 1349; Bridgeman, 2003, Chemical Physics 287: 60). As seen in FIG. 1, spin coated films lack the characteristic vibrations associated with the presence of phosphomolybdic acid.

Mixing solutions of pyrrole and phosphomolybdic acid (1.4 mM and 0.75 mM, respectively) results in the immediate formation of a green solution due to a combination of the oxidized form of phosphomolybdic acid (yellow) and a low concentration of the intensely blue, reduced form of phosphomolybdic acid. This solution gradually results in the production of polymer that precipitates out of solution over the course of several hours. In contrast, a similar mixture of thiophene and phosphomolybdic acid results in no change in colour even over a period of days. This is further complicated by the inability to polymerize thiophene in THF (Aeiyach et al., 1997, Journal of Electroanalytical Chemistry 434: 153). A similar lack of reactivity is observed for identical concentrations in acetonitrile where electrochemical polymerization is possible. Bithiophene and terthiophene on the other hand result in a distinct colour change in acetonitrile indicating that oxidation and polymerization can occur under these conditions.

Upon preparation of the spin coated polythiophene films (onto ITO substrates), the films were in their oxidized state, with an absorbance maximum at approximately 700 nm. In order to study and characterize the electrochemical behaviour of both chemically generated and electrochemically generated polythiophene films, in situ spectroelectrochemistry measurements were performed.

Figure 3A:
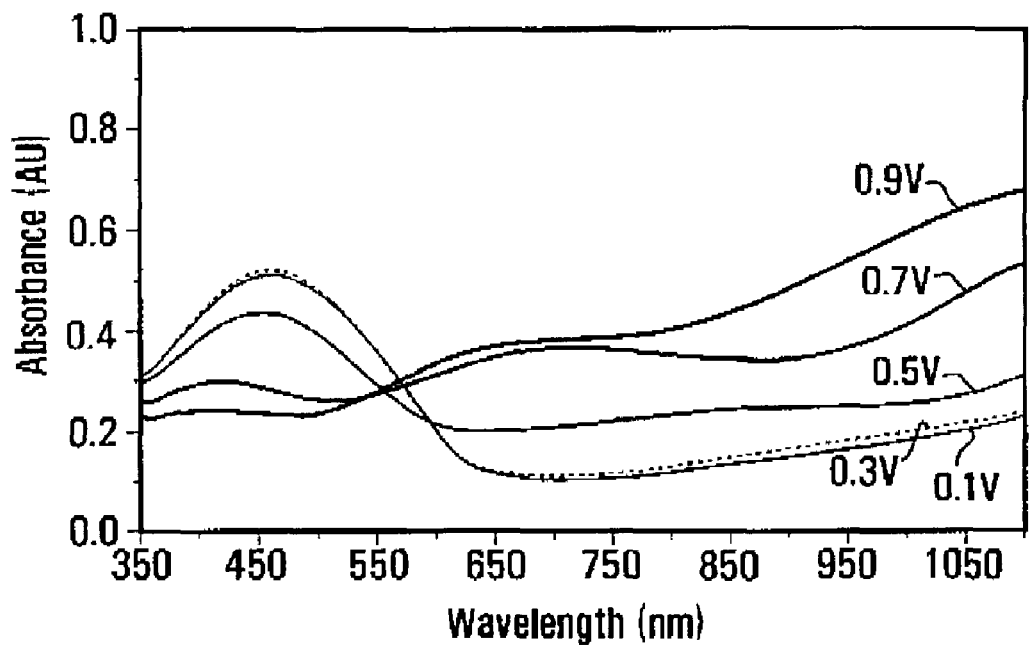
FIG. 3. In-situ Spectroelectrochemistry of both polythiophene a) grown electrochemically b) grown chemically on ITO from bithiophene monomer.
Figure 3B:
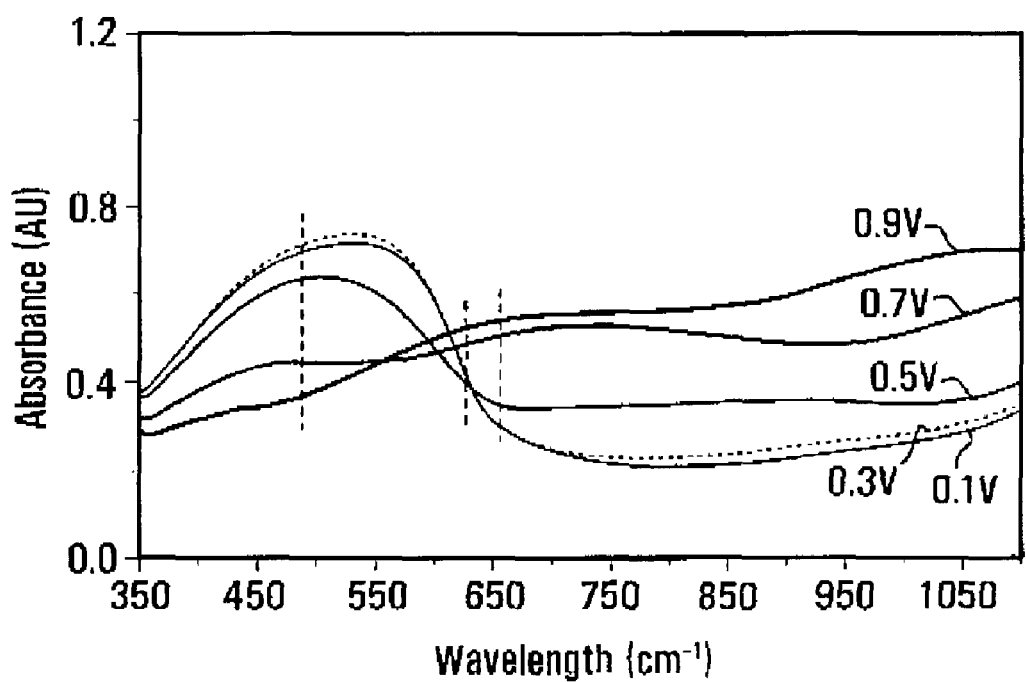

Polythiophene was deposited either electrochemically or chemically onto ITO substrates, rinsed in acetonitrile and let dry at room temperature. Films were subjected to oxidation by applying potential stepwise. FIG. 3a (film deposited electrochemically) shows the disappearance of the peak at ~450 nm due to the oxidation of the polythiophene film, confirmed by the presence of the band at 700 nm. Similar behaviour is observed for the chemically deposited film (see FIG. 3b) the peak sequentially decreases at ~500 nm due to the oxidation of the polythiophene film confirmed by the stepwise appearance of the band at 700 nm.

Figure 4A:
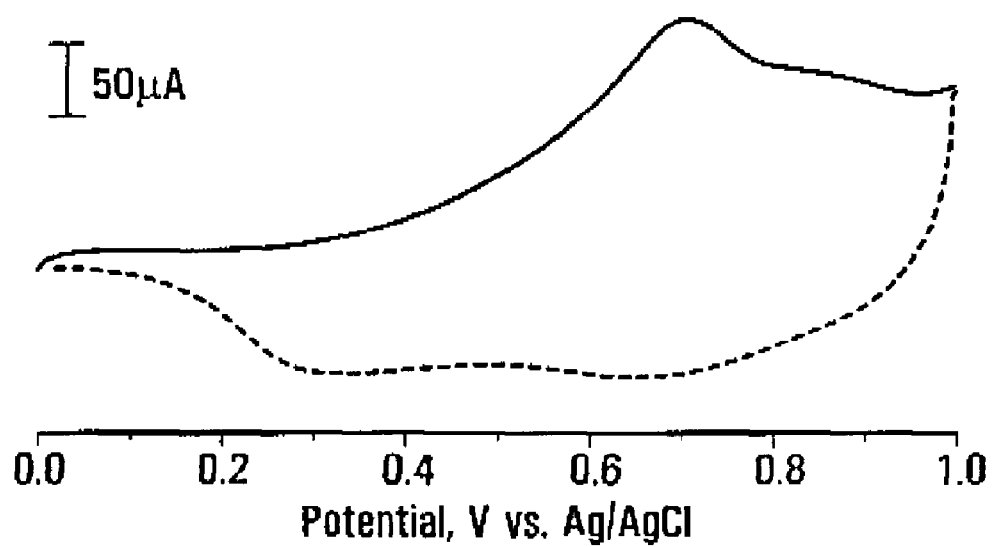
FIG. 4. Cyclic voltammogram of both a) polythiophene grown electrochemically and b) polythiophene spin-coated on ITO in 0.10M TBAPF6/acetonitrile, scan rate=0.05 Vs−1.
Figure 4B:
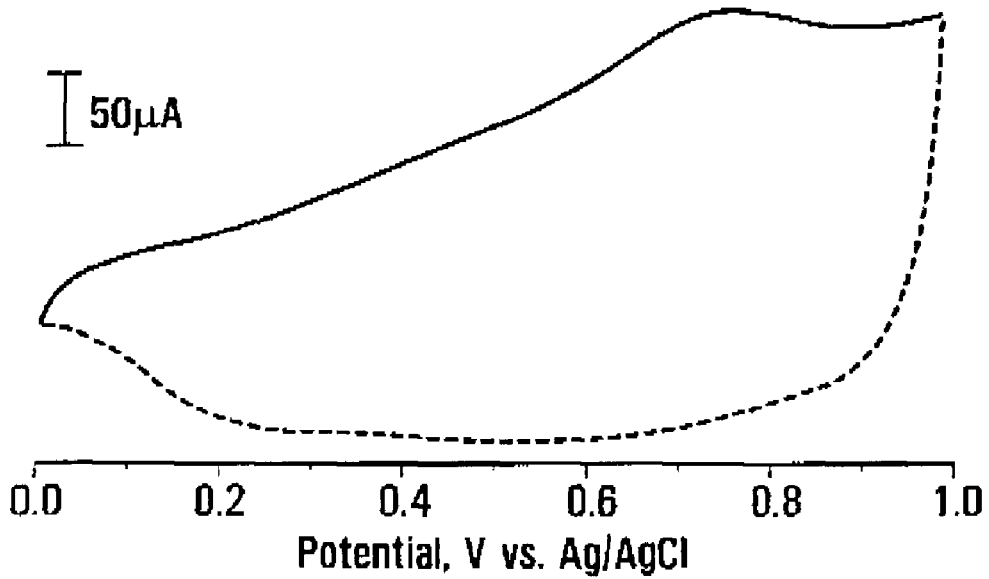

Electrochemistry. A film generated electrochemically from a solution of 10 mM bithiophene in 0.10M TBAPF$_6$/acetonitrile onto ITO substrate in the absence of phosphomolybdic acid served as a control for the study of electrochemical behaviour of polythiophene. FIG. 4a shows the cyclic voltammetry of electrochemically-generated polythiophene film obtained. The oxidation peak occurs at 0.71 V and the reduction peak occurs at 0.65 V. FIG. 4b shows the cyclic voltammetry of chemically generated polythiophene film obtained. The chemically generated film was obtained from a solution mixture of 10 mM bithiophene/5 mM phosphomolybdic acid in acetonitrile onto ITO substrate. Upon completion of the polymerization process, the film was rinsed (in acetonitrile) in order to remove any trace of oxidant and/or unreacted monomer. The oxidation peak occurs at 0.76 V and the reduction peak occurs at 0.55 V, and these values are relatively close to those obtained from the electrochemically-generated film. In this case, there is no redox behaviour present in the chemically grown film associated with the presence of the Keggin structure of phosphomolybdic acid (see FIG. 5b).

Conductivities. Conductivity measurements were performed using a four point probe device. Varying the relative concentration of phosphomolybdic acid in the reaction mixture resulted in variations in conductivity ranging from 0.02 to 0.3 S cm$^{-1}$ (see FIG. 5). The conductivity value reaches its maximum when the concentration of phosphomolybdic acid is between 0.2 and 0.3 M, and then decreases. This is likely due to the fact that at high phosphomolybdic acid concentrations, the film becomes more porous due to the presence of excess acid, and at low concentrations, the polymer is not deposited as efficiently or not completely oxidized. This is supported by the observation that films with lower concentrations of phosphomolybdic acid appear thinner and the colour changes from grey-green to brown within a few days with a corresponding decrease in conductivity. For all the other films, the conductivity remained unchanged over the same time period.

Figure 5:
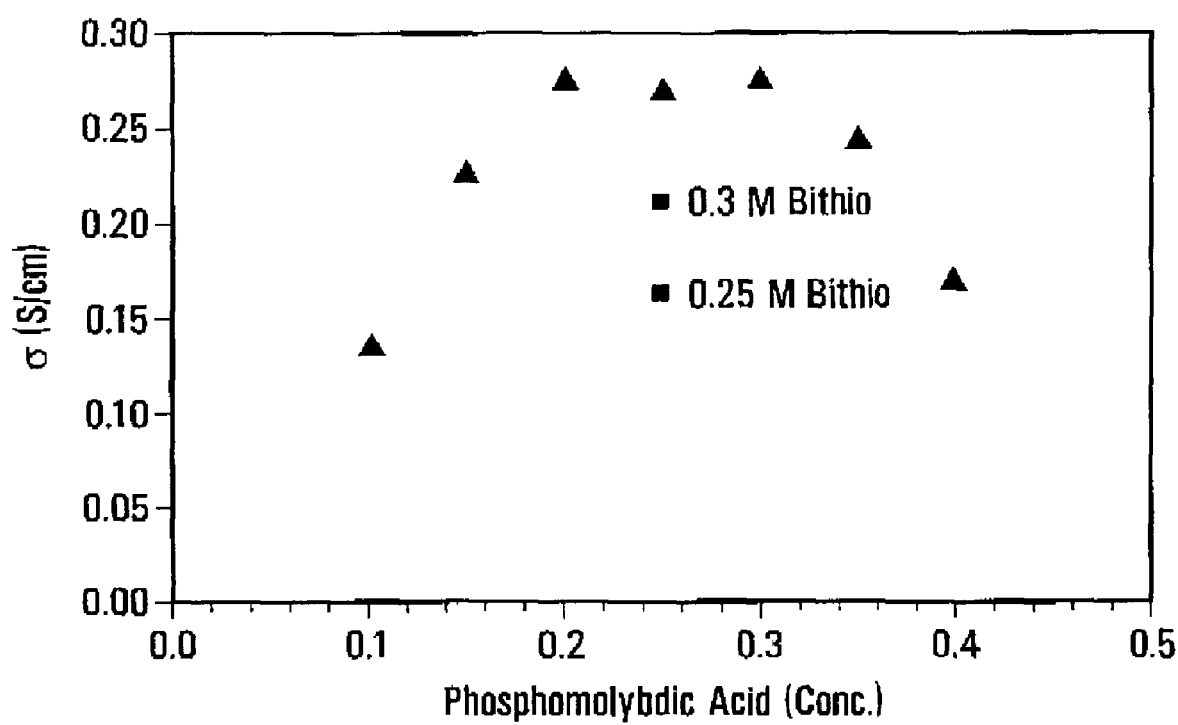
FIG. 5. Conductivity vs. concentration of oxidant (phosphomolybdic acid).

FIG. 5 also shows conductivity values obtained for varying the concentration of bithiophene while keeping the phosphomolybdie acid concentration constant. The conductivity values decrease significantly comparatively to those obtained in the first set of films. The lower conductivity values obtained under these conditions suggests that there was not enough phosphomolybdic acid to efficiently oxidize the polymer. The highest conductivity obtained using our method does not reach values reported in the literature on the order of 4-5 S/cm (Ruckenstein and Park, 1991, Synthetic Metals 44: 293). This may be due to the density of the polymer films.

Solutions increasing concentration of bithiophene and phosphomolybdic acid concentration but keeping equimolar constant solutions were also prepared and spin coated onto glass slides. All films were left to dry for 90 minutes at room temperature. Above the equimolar concentration of 0.3 M and 0.4 M (for both monomer and oxidant) all films either cracked or fell down in pieces from the glass slide. Apparently at higher concentrations polymerization is not complete during the spin coating process. By increasing the monomer concentration while keeping oxidant concentration (0.25M), films were more stable, but some porosity was observed in the obtained films. The best set of films were obtained from solutions of bithiophene 0.2 M with 0.2-0.3 M of phosphomolybdic acid. Spin coating the optimized mixture containing bithiophene resulted in smooth homogenous films.

Figure 6A:
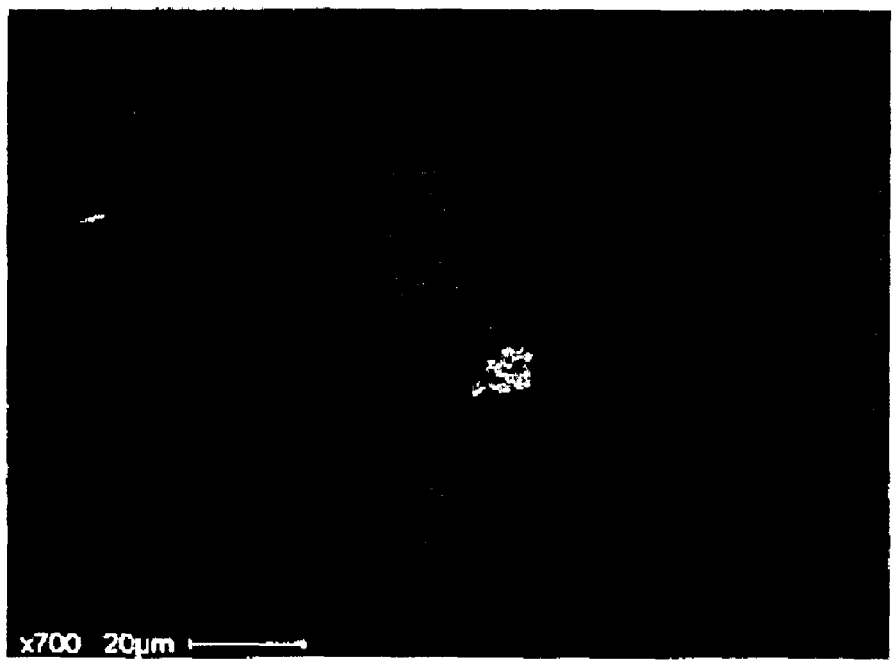
FIG. 6. Scanning electron micrograph of a) polythiophene electrochemically grown on ITO and b) spin coated polythiophene films on glass substrate.
Figure 6B:
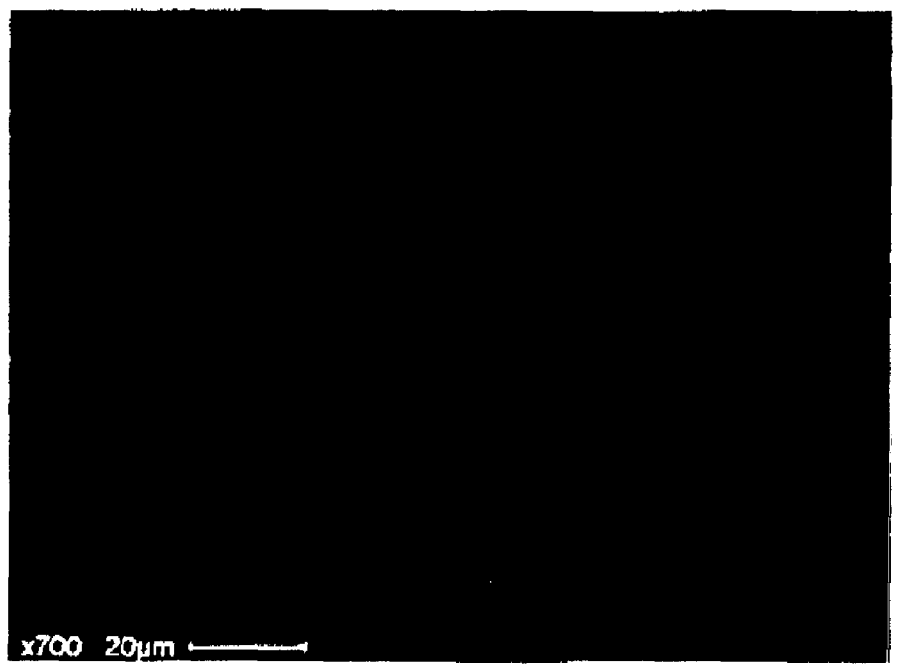

SEM measurements. Scanning electron microscopy of the spin coated polythiophene films onto glass substrate demonstrated that they were significantly smooth and pin-hole free at higher magnifications (see FIG. 6b). EDS analysis of the films indicate the presence of Mo, likely associated with the presence of counter ions required in the oxidized conducting form of the film. In the case of polythiophene chemically grown on ITO (see FIG. 6a) appears also to be smooth and have some features probably related to the ITO surface.

In summary, in this report we have demonstrated that the polymerization approach utilizing metastable monomer/oxidant mixtures for in situ polymerization has been extended to the polythiophene system. Spin coated thin polythiophene films from bithiophene monomer exhibit similar electrochemical behaviour as the electrochemically grown polythiophene films. Films obtained by this method were smooth and exhibit conductivities without the need of conducting substrate, electrolyte or electrochemical equipment. Also, by increasing the concentration of oxidant (phosphomolybdic acid) in the initial mixture it is possible to obtain conducting polythiophene films without the need of an extra oxidizing step of the final films. The films obtained have lower conductivities than those reported in the literature, which may be due to increased porosity associated with the Keggin structure present during polymerization. It was also found that solvent plays an important role in the polymerization process and must be taken into account when applying this approach to new systems.

Material and Chemicals. Phosphomolybdic acid hydrate ($H_3PMo_{12}O_{40}$), pyrrole, thiophene, 2,2'-bithiophene, 2,2':5', 2''-terthiophene, tetrahydrofurane (THF, HPLC grade), acetonitrile (HPLC grade), and tetrabutylammonium hexafluorophosphate (TBAPF$_6$) were purchased from Aldrich and used without any further purification. Indium-doped tin oxide (ITO, 6±2 Ω/square) glass slides were purchased from Delta Technologies, Limited.

Synthesis. The polymerization mixture for synthesizing spin-coated polythiophene consisted of 0.2 M of bithiophene in acetonitrile and 0.1 M of phosphomolybdic acid in acetonitrile. The chemically grown films were spin coated onto either glass substrates (non-conducting materials) or ITO with the following settings: 2000 rpm for 10 seconds. Upon completion of the spin coating process, films were then left to dry at room temperature for 40 min before rinsed with acetonitrile then again left to dry before characterization. Then films were rinsed in acetonitrile to remove unreacted monomer and oligomers. The films were then left to dry at room temperature. The films obtained after the rinsing processes were blue-grey and Four point probe measurements demonstrate these films to be in the oxidized form (the conducting state). Polythiophene films were also prepared using the method above while varying the concentration of oxidant or monomer.

Thicknesses of the films were in the range from 200 to 350 nm as determined by the difference in weight (the glass substrates before and after the spin coating process) the cross area of the glass slide and assuming 1.5 as the density of polythiophene (d=1.4-1.6). For purposes of comparison, polythiophene films were grown electrochemically from a solution of 0.01M bithiophene in a 0.1 M of tetrabutylammonium hexafluorophosphate ($TBPF_6$) in acetonitrile, as electrolyte solution, at a scan rate of 0.1 V/s.

Characterization. UV-vis kinetics. Chemical polymerization of thiophene, bithiophene and terthiophene, with phosphomolybdic acid as oxidant in acetonitrile was studied in bulk solution. When increasing solution concentrations a quartz block was positioned in the quartz cuvette to reduce the path length from 1.0 cm to 0.1 cm. Optical studies were performed on a UV-Vis Chem Station from Agilent Technologies at room temperature. Polarized Modulated Infrared Reflectance absorption spectra (PM-IRRAS) measurements were collected from an accumulation of 300 interferograms at a resolution of 8 $cm^{-1}$ using a Thermo Nicolet Magna IR spectrometer (at room temperature). ITO glass was positioned at 63° with respect to the detector. All Cyclic voltammetric measurements were performed using a CH Instrument, CHI-660 workstation controlled by a PC. A three-electrode set up using a platinum coil auxiliary electrode, a Pt working electrode, and an $Ag/AgNO_3^-$ reference electrode. All measurements were performed using tetrabutylammonium hexafluorophosphate (0.1 M) as electrolyte in acetonitrile. Four point probe measurements were performed using a four-point probe (Signatone Corp.) device attached to a Fluke 87 True RMS multimeter and constant-current source system (CH instrument, CHI-660 workstation controlled by a PC). The separation of the probe is at 40, 50 and 62.5 mils. The electrical conductivity $\sigma$ ($\Omega^{-1}$ $cm^{-1}$) was expressed by the formula $\sigma=(\ln 2/\pi d)(i/V)$, where d is the thickness of the films, i is current passed through outer probes and V is voltage across inner probes. Current was applied within the range of $1.0\times10^{-8}$ to $8.0\times10^{-7}$ A. Scanning Electron Microscopy (SEM) images were collected using a Cambridge 120 SEM with an acceleration of 20 kV, the EDS spectrometer is a Edax Genesis 4000 that, BSE (equipped with a 4-quadrant semiconductor BSE detector) and secondary electron images.

While the preferred embodiments of the invention have been described above, it will be recognized and understood that various modifications may be made therein, and the appended claims are intended to cover all such modifications which may fall within the spirit and scope of the invention.

The invention claimed is:

1. A method of generating a processable polythiophene polymer comprising:
    mixing a monomer and an oxidant in a solvent, wherein the monomer is at least one monomer selected from the group consisting of bithiophene and terthiophene, the solvent is acetonitrile and the oxidant has an oxidation potential that is close to but lower than the oxidation potential of the monomer; and
    evaporating the solvent, thereby producing a processable polythiophene polymer.

2. The method according to claim 1 wherein the monomer is bithiophene.

3. The method according to claim 1 wherein the oxidant is phosphomolybdic acid.

4. The method according to claim 1 wherein the polythiophene polymer is formed by spin coating.

5. The method according to claim 1 wherein the polythiophene polymer produced is smooth and pinhole-free.

6. The method according to claim 1 wherein the monomer is terthiophene.

7. The method according to claim 2 wherein the oxidant is phosphomolybdic acid.

8. The method according to claim 6 wherein the oxidant is phosphomolybdic acid.

9. The method according to claim 2 wherein the polythiophene polymer is formed by spin coating.

10. The method according to claim 6 wherein the polythiophene polymer is formed by spin coating.

11. The method according to claim 2 wherein the polythiophene polymer produced is smooth and pinhole-free.

12. The method according to claim 6 wherein the polythiophene polymer produced is smooth and pinhole-free.

13. The method according to claim 1 wherein the oxidant is phosphomolybdic acid and the polythiophene polymer is formed by spin coating.

14. The method according to claim 2 wherein the oxidant is phosphomolybdic acid and the polythiophene polymer is formed by spin coating.

15. The method according to claim 6 wherein the oxidant is phosphomolybdic acid and the polythiophene polymer is formed by spin coating.

16. The method according to claim 13 wherein the polythiophene polymer produced is smooth and pinhole-free.

17. The method according to claim 14 wherein the polythiophene polymer produced is smooth and pinhole-free.

18. The method according to claim 15 wherein the polythiophene polymer produced is smooth and pinhole-free.

\* \* \* \* \*